E. F. BEUGLER.
MACHINE FOR PREPARING BARREL SHELLS TO RECEIVE HEADS.
APPLICATION FILED JULY 18, 1914.

1,241,080.

Patented Sept. 25, 1917.

WITNESSES
W. Ray Taylor
Julius J. Prible

INVENTOR
Edwin F. Beugler
by Geyer & Popp
ATTORNEYS

E. F. BEUGLER.
MACHINE FOR PREPARING BARREL SHELLS TO RECEIVE HEADS.
APPLICATION FILED JULY 18, 1914.

1,241,080.

Patented Sept. 25, 1917.
5 SHEETS—SHEET 4.

WITNESSES
W. Ray Taylor
Julius J. Prible

INVENTOR
Edwin F. Beugler
by Leiper & Pople
ATTORNEYS

UNITED STATES PATENT OFFICE.

EDWIN F. BEUGLER, OF BUFFALO, NEW YORK, ASSIGNOR TO E. & B. HOLMES MACHINERY COMPANY, OF BUFFALO, NEW YORK, A CORPORATION OF NEW YORK.

MACHINE FOR PREPARING BARREL-SHELLS TO RECEIVE HEADS.

1,241,080.  Specification of Letters Patent.  Patented Sept. 25, 1917.

Application filed July 18, 1914. Serial No. 851,810.

*To all whom it may concern:*

Be it known that I, EDWIN F. BEUGLER, a citizen of the United States, residing at Buffalo, in the county of Erie and State of New York, have invented new and useful Improvements in Machines for Preparing Barrel-Shells to Receive Heads, of which the following is a specification.

This invention relates to a machine for crozing, howeling, chamfering and trimming the ends of the staves and also the ridges between the howels and chamfers of the staves after the same have been assembled to form the body or shell of the barrel and before applying the final hoops and heads thereto.

The object of this invention is to provide a machine for performing these functions accurately, efficiently and expeditiously with a minimum expenditure of labor and power.

In the accompanying drawings:

Fig. 2 is a top plan view of the same, partly in section.
Fig. 11 is a fragmentary horizontal section taken in line 11—11, Fig. 3.
Fig. 12 is a fragmentary horizontal section taken in line 12—12, Fig. 4.
Fig. 16 is a fragmentary longitudinal section showing the manner in which a dog of the chuck ring engages with a hoop of the barrel shell.

Similar characters of reference indicate corresponding parts throughout the several views.

Figures 5, 14:
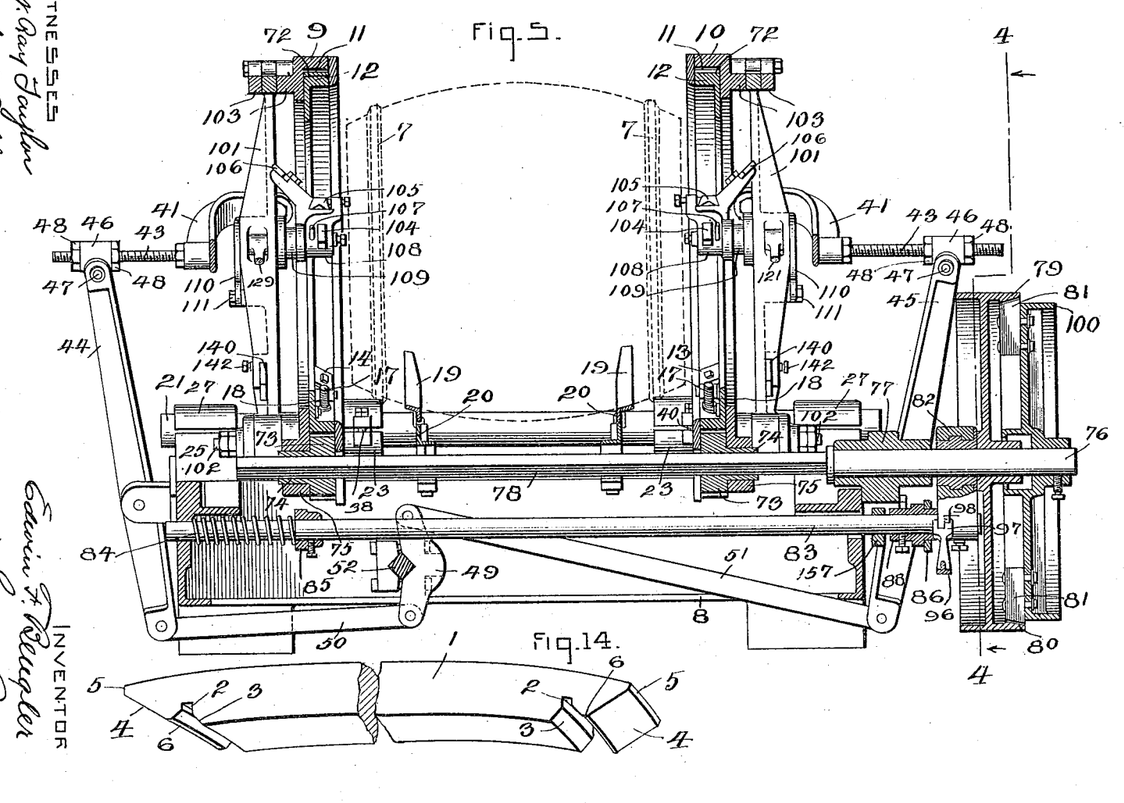
Fig. 5 is a vertical longitudinal section taken on line 5—5, Fig. 2.
Fig. 14 is a fragmentary sectional perspective view of a stave showing the manner in which the various operations are performed on the same by this machine.

Referring to Fig. 14, 1 represents a barrel stave upon which the various operations have been performed by the machine embodying my invention so that when the stave is completed the same is provided with transverse crozes 2 on its inner side near opposite ends thereof, howels 3 at the corners of the crozes, chamfers or bevels 4 between the crozes and the ends of the staves, end faces 5 at the outer ends of the chamfers, and ridge faces 6 between the chamfers and the howels.

While the barrel staves are assembled in the form of a shell or body the same are temporarily held in position relatively to each other by means of temporary hoops 7, preferably of iron while the operations of crozing, howeling, chamfering, trimming or facing the ridges and ends of the staves are being performed in the machine, which temporary hoops engage with the periphery of the shell near its ends and are afterward replaced with permanent hoops or bands in the usual and well known manner.

8 represents the main frame of the machine which may be of any suitable construction to support the different working parts of the machine.

9, 10 represent two head stocks of substantially circular or ring-shaped form arranged transversely and in an upright position above opposite ends of the main frame so that they are in axial alinement lengthwise of the machine. On the inner side of each of the head stocks the same is provided with an internal annular guide groove 11 which receives a rotatable chuck ring 12 adapted to encircle one end of the assembled shell or body of the barrel on the periphery thereof and engage frictionally therewith so that upon rotating this ring the barrel shell will be turned about a horizontal axis.

In order to supplement the frictional engagement of the chuck rings with the barrel body by a positive connection between the same and this shell or body so as to insure turning of the barrel shell with these rings, means are provided which are preferably constructed as follows:

13, 13 represent a pair of dogs mounted on the inner side of each chuck ring preferably on diametrically opposite sides thereof and each provided with a beveled sharpened edge 14 which is adapted to engage by a slight cutting action with the outer side of the adjacent temporary hoop, as shown in Fig. 16 and cause the shell to turn with the respective chuck ring. In order to enable each dog to adapt itself to the particular part of the temporary barrel hoop with which it engages and thus permit of slight variations in the relation of these parts without affecting the operation of the machine each of these dogs is yieldingly supported. The preferred means for this purpose, shown in Figs. 5 and 6, comprise a rock lever 15 pivoted on the chuck ring to turn vertically and carrying the respective chuck dog on its front arm, a spring arm 16 mounted on the adjacent part of the chuck ring and engaging its free end with the rear arm of the respective dog lever, a tension bolt or rod 17 passing through the overlapping rear arm of the dog lever and the companion spring arm and connected with said arm of the dog lever, and a coil spring 18 surrounding the tension bolt or rod and bearing at its outer end against the inner side of the spring arm while its inner end bears against a nut or shoulder on the inner end of the tension bolt or rod. The resilience of the spring arm and the tension spring operate constantly to cause the spring arm and the rear arm of the dog lever to lie flatwise against each other for holding the beveled gripping edge of the dog in the path of the temporary barrel hoop. Preparatory to chucking the barrel shell in the chuck rings the head stocks are separated a sufficient distance to permit the barrel shell to be placed between the head stocks after which the latter are moved axially toward each other so that the chuck rings surround the ends of the barrel shell and engage frictionally with the periphery thereof and the beveled edges of the several dogs engaged with the outer sides of the temporary hoops. As the dogs engage with the temporary hoops the same are deflected outwardly more or less in adapting themselves to these hoops and during this deflection the dog levers turn more or less so that the rear arms thereof are tipped relatively to the spring tension arms 16 and cause the tension springs 18 to be strained, whereby the dogs are enabled to adapt themselves to the temporary hoops and are yieldingly held in engagement therewith so that they firmly grip the hoops by slightly indenting the same and insure turning of the barrel shell or body with the chuck rings. Upon separating the head stocks from the barrel shell the dogs are disengaged from the hoops and again resume their normal inner position under the action of their spring arms and tension springs preparatory to engaging with the temporary hoops of the next barrel shell.

Figures 1, 15:
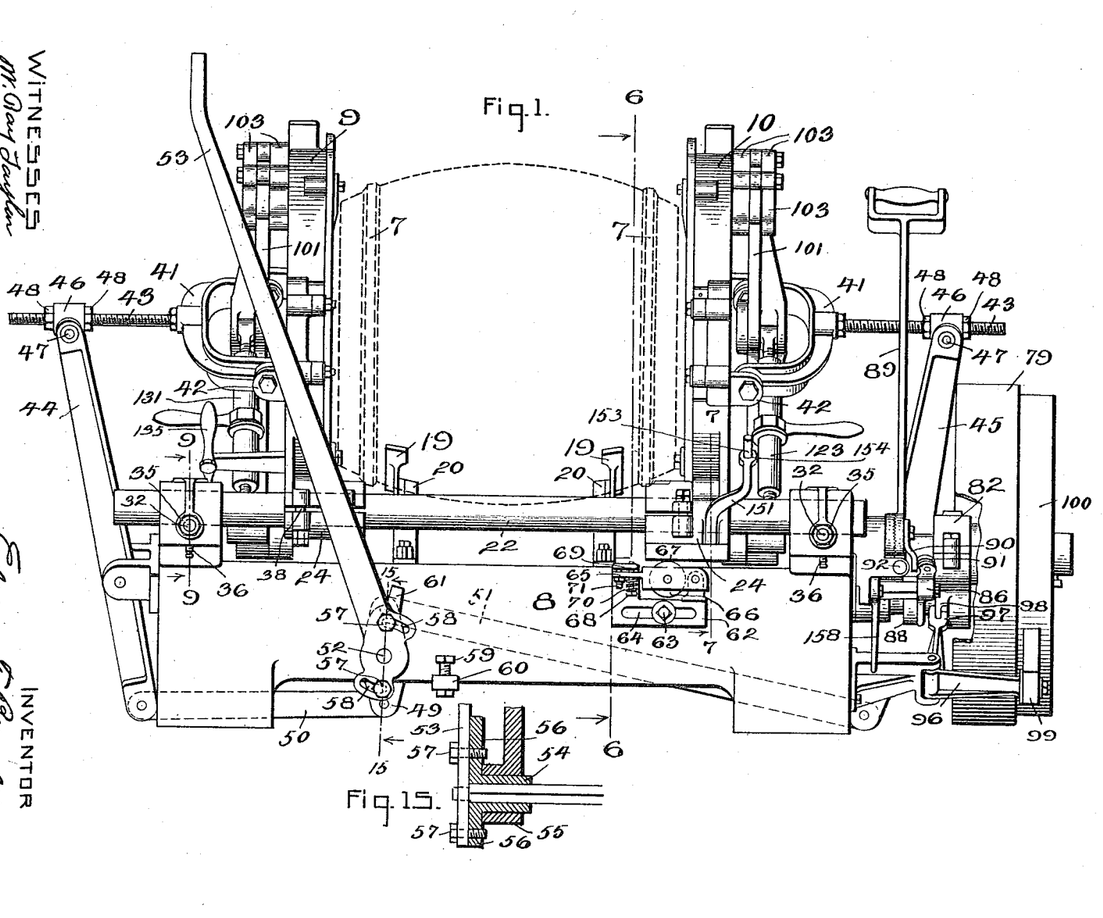
Figure 1 is a front elevation of a machine embodying my improvements and showing the parts in their inoperative position.
Fig. 15 is a fragmentary vertical transverse section in line 15—15, Fig. 1.
Figures 1B, 2, 11, 12:
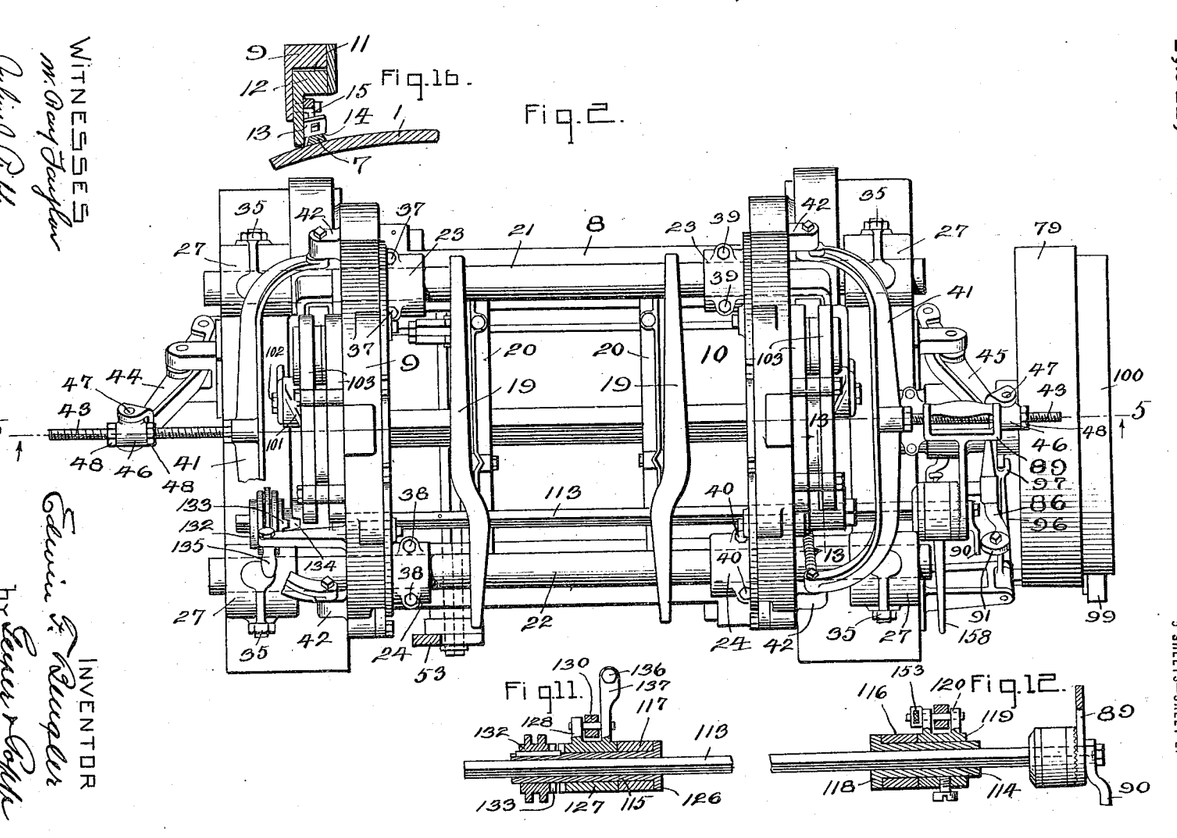

While the barrel shell is thus arranged between the head stocks preparatory to being chucked thereon and also after the head stocks are withdrawn preparatory to removing the shell after the work upon the same has been completed the barrel shell is supported between the head stocks by means of two saddles 19, 19 which may be of any suitable construction and supported upon the adjacent parts of the main frame, for instance, by means of two bridges and cross pieces 20 arranged transversely between the two head stocks and resting at their opposite ends on the longitudinal side pieces of the frame, as shown in Figs 1, 2 and 5.

Figures 6, 7, 8, 9, 10:
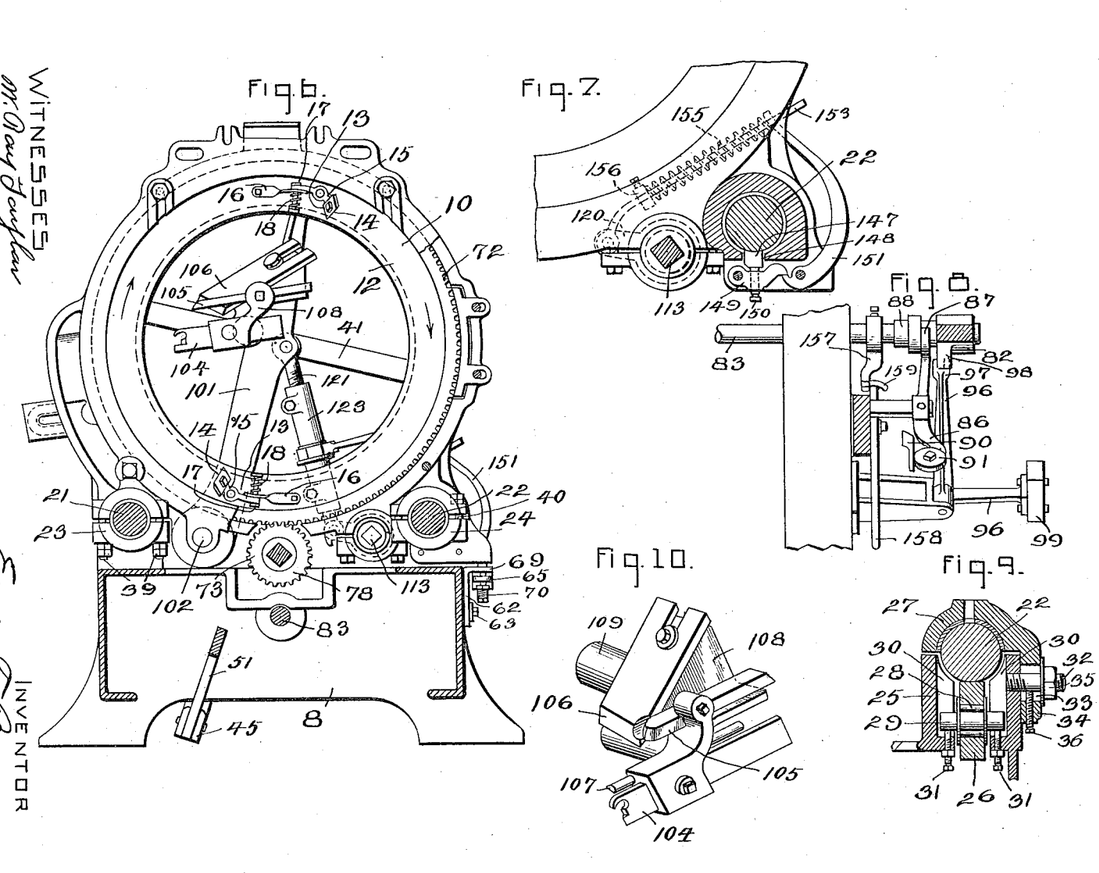
Fig. 6 is a vertical transverse section taken in line 6—6, Fig. 1 looking toward the right.
Fig. 7 is a fragmentary vertical transverse section, on an enlarged scale, taken in line 7—7, Fig. 1.
Fig. 8 is a fragmentary horizontal section taken in line 8—8, Fig. 4.
Fig. 9 is a fragmentary vertical transverse section, on an enlarged scale, taken in line 9—9, Fig. 1.
Fig. 10 is a detached perspective view of a holder supporting the chamfering, crozing, howeling and burring cutters.

Arranged lengthwise above this frame and parallel with each other are two horizontal supporting bars 21, 22, preferably of cylindrical form. Upon these supporting bars are mounted the head stocks by providing each of the latter on its lower part with front and rear supporting sleeves 23, 24 which embrace the corresponding ends of the supporting bars. Each of these supporting bars is mounted at its opposite ends on the main frame so as to be capable of longitudinal movement by means of bearings each of which may be of any suitable construction but preferably comprises a lower hollow base 25 projecting upwardly from the adjacent part of the frame and receiving the adjacent lower part of the respective supporting bar, a wheel 26 arranged within this base and engaging with the underside of the respective supporting bar, and a cap 27 engaging with the adjacent upper part of said supporting bar and connected with the companion base. The supporting wheel is preferably supported by means of an annular row of rollers 28 on a horizontal axle 29 which has its opposite ends arranged in vertical slots 30 formed in the inner sides of the base and rest with their undersides on the upper ends of vertical adjusting screw 31 arranged in the adjacent upper part of the standard. In this manner a rolling anti-friction support is provided for the supporting bars which permits of moving the same easily together with the parts mounted thereon with a minimum expenditure of labor while adjusting the machine. The cap 27 is adjustably connected with the standard so as to hold the supporting bar properly in engagement with the wheel 26 and prevent the parts from becoming displaced while operating the machine. This adjustable connection, as shown in Fig. 9, preferably comprises a horizontal screw or stud 32 mounted on the outer side of the respective base and projecting through a vertical slot 33 in a retaining arm 34 depending from the adjacent part of the cap, a screw nut 35 arranged on the stud and bearing by means of an interposed washer against the outer side of the retaining arm, and an adjusting screw 36 arranged in the lower part of the retaining arm and engaging with the underside of the clamping stud 32. By turning the screws 31 so as to raise the wheel 26 and then turning the screw 36 so as to lower the cap the supporting bar may be adjusted vertically to the required position and held reliably in place for properly operating the machine.

Each of the head stocks is normally rigidly connected with one of the supporting bars so as to move therewith lengthwise of the machine and is slidably connected with the other supporting bar so that when adjusting the head stocks toward and from each other the supporting bars slide lengthwise of the machine in opposite directions on the main frame, thereby slidably supporting the head stocks indirectly on the frame and maintaining the same in axial alinement with each other without liability of becoming displaced relatively to each other when the head stocks and the parts mounted thereon are subjected to strains during the operation of the machine. In the preferred construction the head stock at the left end of the machine is secured to the front supporting bar by clamping its front sleeve on said bar and this head is slidable relatively to the rear supporting bar by mounting the rear sleeve of this head stock loosely on the last mentioned supporting bar. The front and rear supporting sleeves of the left head stock are both split lengthwise on diametrically opposite sides of the respective supporting bars and the parts thereof are connected by means of clamping bolts or screws 37, 38 which may be suitably tightened so that the front sleeve grips the front supporting bar for fixedly connecting the left head stock therewith while its rear guide sleeve frictionally engages the rear supporting bar only sufficiently to hold these parts properly in position relatively to each other but permit the left head stock and rear supporting bar to slide lengthwise one with reference to the other.

The right head stock is preferably connected rigidly with the rear supporting bar so as to be movable lengthwise therewith by splitting its rear supporting sleeve and drawing the sections thereof tightly against opposite sides of this bar by means of clamping bolts or screws 39, and the right head stock is movable lengthwise relatively to the front supporting bar by mounting the front supporting sleeve of this head stock loosely on the front supporting bar, this last mentioned sleeve being also split diametrically and the sections thereof connected by means of clamping screws 40 so as to hold the right head stock properly in frictional engagement with the front supporting bar. By loosening the clamping screw 38 of the front supporting sleeve of the left head stock and the clamping screw 39 of the rear supporting sleeve of the right head stock, both head stocks may be adjusted axially toward and from each other in a direction lengthwise of the machine for adapting the head stocks and the parts mounted thereon to operate on barrels of different length or height.

The longitudinal movement of the head stocks and associated parts for choking and releasing a barrel shell is preferably effected by the following means which are best shown in Figs. 1, 2, 3, 4 and 5.

41, 41 represent two substantially horizontal yokes each of which is arranged diametrically across the outer side of one of the head stocks and pivotally connected at its substantially horizontally opposite ends by means of radial pivots or bolts 42 with the outer side of the respective head stock so as to be capable of swinging in a substantially vertical plane relatively thereto. Each of these yokes is provided with a horizontal screw shank 43 projecting outwardly therefrom in line with the axis of the respective head stock or substantially so. 44, 45 represent two upright end rock levers which are pivoted on suitable brackets mounted on the opposite ends of the main frame and each of which is pivotally and adjustably connected at its upper end with the screw shank of one of the head stock yokes. This connection may be varied but, as shown in Figs. 1, 2, 4 and 5, the same preferably comprises a sleeve 46 mounted on the respective screw shank and connected on its underside by a horizontal pin 47 with the upper end of the adjacent end lever, and screw nuts 48, 48 mounted on the screw shank and engaging with opposite ends of the sleeve 46. Upon tightening one of the screw nuts 48 and loosening the other the respective screw shank 43 may be adjusted relatively to the companion end lever in order to suit the position of the companion head stock on the supporting bars lengthwise of the machine. 49 represents an intermediate upright rock lever which has its upper and lower arm connected respectively by means of links 50, 51 with the lower arms of the end lever 44, 45, as shown in Fig. 5, so that upon rocking this intermediate lever in one direction the head stocks will be moved toward each other for chucking a barrel body or shell while upon turning the intermediate lever in the opposite direction the head stocks will be separated for releasing the barrel shell. For this purpose the intermediate rock lever is mounted upon a horizontal rock shaft 52 which is journaled transversely in suitable bearings on the lower part of the main frame and provided at its front end outside of the main frame with a suitable upright operating handle or lever 53 whereby this rock shaft may be turned. This hand lever is preferably adjustably connected with the rock shaft 52 to suit the convenience of the operator and also the length of the barrel which is being operated upon. The preferred means for this purpose consist in providing the front end of the rock shaft with a cylindrical bearing sleeve 54 which engages with a correspondingly-shaped bearing 55 in the adjacent part of the frame and forms the front support of this shaft, two attaching arms 56 projecting upwardly and downwardly from this bearing sleeve, and engaging with the rear side of the hand lever, and clamping screw or bolts 57 connecting the hand lever and attaching arms 56 and passing through curved slots 58 arranged in this handle arm on opposite sides of the axis of the rock shaft and concentrically therewith. Upon loosening the clamping bolts or screws 57 the hand lever may be turned vertically as best suits the convenience of the operator for chucking a particular length of barrel after which the hand lever may be secured to the rock shaft 52 by tightening the clamping bolts 57. The downward or forward movement of this hand lever is preferably limited by a stop device which is preferably so constructed that it is adjustable to suit different lengths of barrels. In its preferred form this stop device consists of a screw 59 secured in an upright position to a bracket 60 on the front part of the main frame and a stop lug 61 arranged on the upper attaching arm 56 and adapted to bear against the upper end of this stop screw.

When the two chuck rings are in engagement with opposite ends of the barrel shell it is desirable to engage the front sliding sleeve of the right head stock with the front supporting bar and the rear sleeve of the left head stock with the rear supporting bar with the maximum pressure derived from the weight of the head stocks and the parts mounted thereon for the purpose of holding the same in place during the operation of the machine, but during the time that the operator is moving the head stocks into and out of this operative position it is desirable to relieve the supporting bars from the pressure of the respective head stocks which slide thereon in order to render the operation of chucking and releasing a shell less laborious and also reduce the wear on the machine. For this purpose a relieving device is provided for each head stock which is preferably constructed as follows:

62 represents a bracket secured to the outer side of the main frame below the normally slidable supporting sleeve of each head stock and preferably connected with the frame so as to be adjustable lengthwise thereof to suit the position of the companion head stock, this adjustable connection, as shown in Fig. 1, preferably consisting of a clamping bolt 63 connecting this bracket and the main frame and passing through a longitudinal slot 64 in the bracket. On its upper part this bracket is provided with a vertically swinging lifting or supporting arm 65 which is pivoted at one end to this bracket and is provided adjacent to its pivot with an anti-friction wheel or roller 66 engaging with a horizontal bearing face 67 formed on the under side of the respective supporting sleeve. This supporting arm is yieldingly held in its elevated position by means of a bolt 68 connected at its upper end with a laterally projecting lug 69 formed on the bracket, and a spring 70 surrounding the bolt and bearing at its upper end to the underside of the lug 69 and at its lower end against a shoulder on the bolt 68, as shown in Fig. 1. By turning this bolt 68 the resilience of this spring may be increased or decreased. The upward movement of the supporting or lifting arm and roller is preferably limited by means of a stop which may consist of a screw 71 arranged on the lifting arm and adapted to engage with the underside of the supporting lug 69, as shown in Fig. 1. In the retracted inoperative position of the head stocks, as shown in Fig. 1, the underside of the sliding supporting sleeve of each of these head stocks rests upon the upper side of the lifting roller of the companion friction reducing device, thereby relieving each of the supporting bars at this time from the frictional engagement with the other head stock and enabling the operator to easily effect the initial portion of the movement of the head stocks toward each other. During the last portion of the movement of the head stocks toward each other the sliding supporting sleeves clear the lifting rollers 66 so that the weight of the head stocks presses the sliding sleeves firmly against the supporting bars and causes these parts to engage each other with a frictional grip which aids in retaining the same in their proper relative position. After the operator has effected the initial part of the retracting movement of the head stocks for releasing the barrel shell from the chuck rings and is effecting the last part of this outward movement of the head stocks the sliding supporting sleeves engage with the lifting rollers 66 so that this last mentioned movement of the head stocks may be effected by the operator with comparative ease and without unnecessary wear upon the machine. Furthermore, by thus relieving the pressure of each head stock against the other supporting bar in the retracted or inoperative position of the head stocks it is possible for the operator to handle the machine quicker and thereby increase the output of the machine.

After the chuck rings have been applied to opposite ends of the barrel shell these rings together with the barrel are rotated, preferably in the direction of the arrow shown in Figs. 3, 4 and 6, by means which are preferably constructed as follows:

72 represent annular gear rims or gear teeth formed on the periphery of the chuck rings and engaging with the bottom of the guide groove therein so as to hold these rings centrally within the respective head stocks. On the underside of each chuck ring its gear teeth are engaged by a driving gear pinion 73 which is confined against axial movement on the respective chuck ring. This gear pinion is journaled upon the adjacent part of the companion head stock by journaling the hub 74 of this pinion in a bearing 75 on the lower part of the respective head stock, as shown in Fig. 1. These driving gear pinions are mounted upon a horizontal driving shaft which is arranged lengthwise in the machine so that these gear pinions are capable of sliding on this driving shaft upon adjusting the head stocks toward and from each other but are compelled to turn with the driving shaft. For this purpose the driving shaft is provided with a cylindrical portion 76 at the right hand end thereof which is journaled in a stationary bearing 77 on the adjacent right end of the main frame, and a portion 78 at the left hand end of the shaft which is preferably square in cross section and engages the corresponding shaped bores in the hubs 74 of the driving gear pinions 73, as shown in Figs. 5 and 6. By this means a driving connection is established between the driving shaft and the driving pinions which is unaffected by the longitudinal movement of the head stock toward and from each other.

Power may be applied to the driving shaft in any suitable manner but preferably by means of a driving pulley 79 which is adapted to receive a driving belt and which is mounted loosely on the cylindrical portion of the driving shaft but is capable of axial movement thereon for engaging the conical bore or clutch face 80 on its rim with or disengaging the same from the clutch shoes 81 arranged on a clutch disk secured to the adjacent outer end of the driving shaft. Upon pressing the driving pulley axially outward so that its rim engages with the shoes of the clutch disk the driving shaft is compelled to turn with the driving pulley but when the outward pressure on the driving pulley is removed the frictional grip of this pulley on the clutch shoes is released, thereby disconnecting the driving shaft and driving pulley and permitting the latter to turn while the driving shaft remains at rest. The preferred means for coupling and uncoupling the driving shaft and driving pulley which are shown in Figs. 1, 2, 4, 5 and 8 are constructed as follows:

82 represents an axially movable shifting block slidably mounted upon the cylindrical portion of the driving shaft and connected on one side of the driving shaft with the right end of a shifting rod 83 which is guided horizontally and lengthwise in the lower part of the main frame. This shifting block and rod when free are moved toward the right by means of a shifting spring 84 surrounding the shifting rod and bearing at one end against a collar 85 on this rod and a shoulder formed by the adjacent part of the main frame whereby the shifting block is pressed against the inner side of the driving pulley and the latter is pushed axially outward and engages its rim with the clutch shoes for coupling the driving pulley and shaft. The shifting block and rod are moved inwardly so as to relieve the driving pulley from coupling pressure by means of a lower intermediate shifting lever 86 pivoted on the adjacent part of the right end of the main frame so as to swing in a substantially horizontal plane and provided at its rear arm with a fork 87 which embraces a shifting collar 88 on the shifting rod, and a vertically swinging controlling lever 89 pivoted on the adjacent part of the right end of the main frame and provided with a depending cam 90 which engages with a roller 91 on the front arm of the shifting lever 86. When the controlling lever is turned into its rearmost position, as shown in Fig. 4, the cam 90 is in its foremost position and turns the shifting lever so as to cause the shifting rod to be retracted to the left and the outward pressure on the driving pulley to be relieved, whereby the latter is uncoupled from the driving shaft and the operation of the machine arrested. When, however, the controlling lever is turned into its forward position and its cam 90 is moved rearwardly the shifting lever is released and the spring 84 is permitted to shift the rod 83 and block 82 outwardly lengthwise of the driving shaft for coupling the driving pulley with this shaft and causing the machine to operate.

Figures 3, 4, 13:
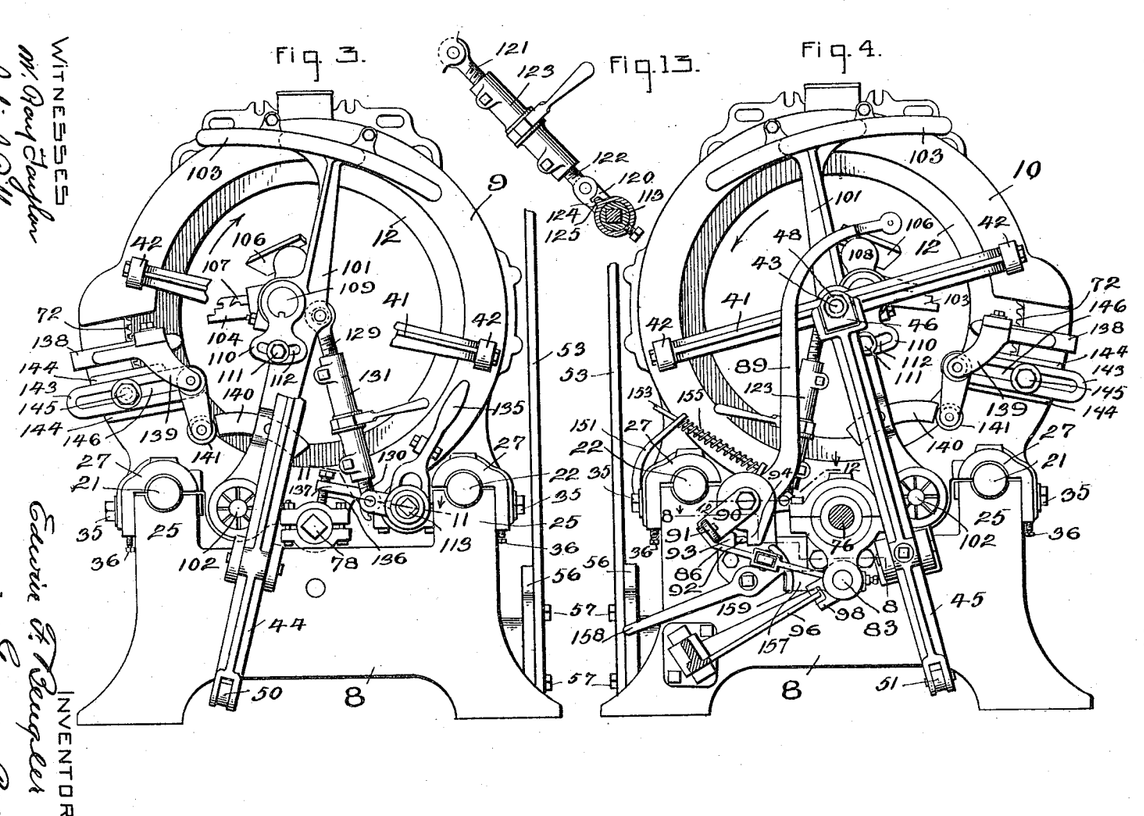
Fig. 3 is an elevation of the machine viewed from the left hand end thereof.
Fig. 4 is a sectional elevation of the machine viewed from the right hand end thereof, the sectional part being taken in line 4—4, Fig. 5.
Fig. 13 is a fragmentary vertical section in line 13—13, Fig. 2.

The turning of the controlling lever in the direction for uncoupling the driving pulley and shaft is preferably arrested by a stop device which is adjustable and which preferably comprises a stop screw 92 arranged in a lug 93 on the right end of the frame in position to be engaged by a stop lug 94 arranged on the hub of the controlling lever, as shown in Figs. 1 and 4.

In order to cause the rotation of the driving shaft to be arrested immediately upon disconnecting the same from the driving pulley a brake mechanism is provided which preferably comprises an elbow lever 96 pivoted on the right hand end of the main frame and having an inwardly projecting arm which is provided with a fork 97 engaging with a lug 98 on the shifting block, and a horizontally projecting arm provided with a brake shoe 99 arranged opposite the face of an annular brake flange 100 formed on the clutch disk. Upon moving the shifting block inwardly or away from the driving pulley the brake lever 96 is turned in the direction for engaging the brake shoe with a brake flange of the clutch disk, thereby arresting the rotation of the driving shaft and the parts operatively connected therewith. When, however, the shifting block is moved outwardly for causing the driving pulley to couple with the driving shaft then the brake lever is turned in the opposite direction and the brake shoe is moved away from the brake flange so that the driving shaft and associated parts are free to turn. The cutter mechanism whereby the howels, crozes, chamfers, ridge faces and end faces are produced on the staves of the barrel is constructed and operated as follows:

101, 101 represent two main cutter levers which are arranged in an upright position adjacent to the outer sides of the head stocks and each of which is pivoted at its lower end to the lower part of the respective head stock by means of a horizontal longitudinal bolt 102 so that this cutter lever can swing in a vertical plane crosswise of the axis of the respective chuck ring and head stock. In order to prevent the free cutter levers from springing laterally out of place each of these levers has its upper free end controlled by means of a guide which preferably comprises two guide rails 103 curved concentrically with the axis of the companion main cutter lever and mounted on the adjacent outer part of the respective head stock so as to form a slot between them which receives the upper end of the respective cutter lever. Upon the central part of each of these main cutter levers is mounted the blades, knives or cutters for producing the croze, howel, chamfer and ridge face at one end of the staves of the barrel shell. As shown in Figs. 3, 4, 5, 6 and 10, 104 represents the cutter which produces the croze, 105 the cutter which produces the howel, 106 the cutter which produces the chamfer and 107 the cutter which produces the ridge face at one end of the staves of the barrel body or shell. In the chucked position of the barrel shell on the chuck rings each set of croze, howel, chamfer and ridge face cutters or blades is arranged within the barrel shell adjacent to one end thereof and these cutters or knives are so mounted upon the companion cutter lever that upon swinging the latter outwardly these cutters will be engaged with the end portion of the staves on the inner sides thereof for producing the above described operation on the staves. Various means may be provided for adjustably supporting these blades on this cutter lever so that they may be presented to the staves in the best position for doing their work and also to permit of taking up wear when these cutters become worn. As shown in the drawings these several blades are preferably mounted adjustably on the head 108 of a tool holder which head is provided with a horizontal cylindrical shank 109 journaled in a horizontal bearing on the adjacent main cutter lever so that the tool head and the cutters mounted thereon are arranged on the inner side of the main cutter lever. The tool holder may be turned in a vertical plane for presenting the cutters or blades thereon in the most favorable position to the staves. The preferred means for this purpose which are shown in Figs. 3, 4 and 5 comprising an adjusting arm 110 secured to the outer end of the tool holder shank and adjustably connected with the adjacent part of the respective cutter lever by means of a clamping screw or bolt 111 passing through a curved slot 112 in the adjusting arm. Upon loosening the clamping bolt the tool holder may be rocked about the axis of the shank 109 to the desired position and then held in place by again tightening this clamping screw. In the inoperative position of the several cutters which are mounted on the tool holder the main cutter lever extends in a substantially diametrical position across the companion head stock and chuck ring in which position these cutters are retracted out of the path of the staves and are in their inoperative position. Upon swinging the cutter lever laterally outward transversely of the axis of the barrel, chuck ring and head stock the cutters mounted on the main cutter lever are engaged with the inner sides of the end portions of the staves and produce the various operations thereon corresponding to these cutters. The means whereby the two main cutter levers are thus moved transversely into and out of their operative positions is effected by the movement of the controlling lever upon connecting and disconnecting the driving pulley and driving shaft. The preferred means for this purpose is best shown in Figs. 1-6 and 12 and constructed as follows:

113 represents a longitudinal operating or controlling shaft which is preferably square in cross section and arranged lengthwise between the underside of the head stocks and the upper part of the main frame. To the right hand end of this shaft is secured the operating or controlling lever 89 and the cam arm 90, as shown in Figs. 1, 2, 4 and 12. 114, 115 represent right and left bearing sleeves which are journaled respectively with their outer cylindrical sides in bearings 116, 117 in the lower parts of the right and left head stocks and each of which is provided with an axial opening of square cross section which receives the operating shaft 113 so that these sleeves are compelled to turn with this shaft but are free to turn thereon. The right bearing sleeve 114 is provided at its inner end with an enlargement or collar 118 which bears against the inner side of the right hand head stock while its opposite end has secured thereto the hub 119, of a lower toggle arm 120 which hub bears against the outer side of the right head stock, thereby holding the bearing sleeve 114 against axial movement on this head stock. The lower toggle arm is connected with the central part of the right main cutter lever by means of a toggle link which preferably comprises an upper screw shank 121 pivotally connected with the respective cutter lever, a lower screw shank 122 pivotally connected with the respective toggle arm and an adjusting sleeve 123 having right and left hand screw threads whereby the same is connected with the upper and lower screw shanks. Upon turning the operating shaft 113 so that the toggle arm is in a substantially horizontal position and the pivotal connection between the same and the toggle link is on one side of a line extending from the axis of the operating shaft to the pivotal connection between the toggle link and the companion cutter lever, the latter and the parts mounted thereon will assume the position indicated in Fig. 4, in which position the cutters on this lever are retracted into their inoperative position. Upon turning the operating shaft 113 so as to bring the pivotal connection between the toggle arm and toggle link on the dead center line extending from the axis of the operating shaft to the upper pivot of the toggle link, as shown in Fig. 13, the respective cutter lever will be swung outwardly and bring the cutters mounted thereon into engagement with the staves of the barrel shell. The position of these cutters relatively to the barrel staves may be adjusted by turning the adjusting sleeve 123 of the toggle link in one direction or the other by means of a wrench applied to the hexagonal central part of this sleeve, as shown in Fig. 4, and thereby either shorten or lengthen this toggle link as required. In order to arrest the movement of the toggle arm and toggle link when these parts have been turned into a position in which the pivotal connection between the same is on the dead center or in line with the axis of the operating shaft and the upper pivot of the toggle link a stop device is provided which preferably comprises a stop lug 124 arranged on the lower screw shank below the pivotal connection between the same and the toggle arm and engaging with a stop lug 125 formed on the opposing part of the hub of the companion toggle arm, as shown in Fig. 12, thereby avoiding throwing the toggle arm and toggle link past the dead center and holding the same in a locked position relatively to each other and effectually supporting the cutter lever while its cutters or blades are engaging the barrel staves.

The bearing sleeve 115 which is journaled in the left head stock is provided with a collar 126 at its inner end which bears against the inner side of this head stock and on the outer part of this bearing sleeve is mounted the hub 127 of a lower toggle arm 128 which bears against the outer side of the left head stock, as shown in Fig. 11. This last mentioned toggle arm is connected with the left main cutter lever by means of a toggle link comprising upper and lower screw shanks 129, 130 which are pivotally connected respectively with this left cutter lever and the left toggle arm, and an adjusting sleeve 131 having right and left hand screw threads engaging with the corresponding threads of the upper and lower screw shanks 129, 130, so that upon turning this sleeve by means of a wrench applied to the hexagonal center part of the same this toggle link may be lengthened or shortened. The toggle arm and link associated with the left main cutter lever operate simultaneously with the toggle arm and link associated with the right main cutter lever and in the same manner described with reference to the right main cutter lever so that both of these cutter levers are moved in unison for engaging their cutters with the barrel staves and disengaging the same therefrom upon turning the operating shaft 113 in one direction or the other by means of the operating lever. The right toggle arm is prefereably connected permanently with its bearing sleeve 114 so that when the operating shaft and operating lever are rocked the right hand cutter lever is always moved for engaging or disengaging the cutters mounted thereon with the barrel staves. The left toggle arm is however preferably provided with means whereby the same may be either connected with its companion bearing sleeve 115 or disconnected therefrom in order to permit of moving both of the cutter levers into and out of their operative position when it is desired to cut both ends of the staves of the shell at the same time or the left cutter lever may be disconnected from the operating shaft and rendered inoperative so that upon rocking this shaft only the right cutter lever will be moved into and out of its operative position for cutting the staves only at the right hand end of the barrel shell. The purpose of thus disconnecting one of the cutter levers from the shifting mechanism is to enable the cooper when he discovers a defected stave in the barrel shell to cut only one end of the staves in the shell, then replace the broken stave by a good one, after which the simultaneous cutting of both ends of the staves in the barrel shell may be resumed and completed simultaneously. In making such repairs it is customary to have a lot of staves on hand which have one end cut with the appropriate croze, chamfer and howel so as to permit of readily assembling the same with the remaining staves in the barrel which is being repaired preparatory to completing the cutting of both ends of the staves.

Various means may be provided for connecting and disconnecting the left main cutter lever with the operating shaft, those shown in Figs. 1, 2, 3 and 11 being preferred and comprising a clutch sleeve 132 splined on the outer end of the bearing sleeve 115 and provided on its inner end with clutch teeth 133 which are adapted to engage with clutch teeth 134 on the outer end of the hub of the left toggle arm. When the clutch sleeve 132 is moved inwardly so that its teeth interlock with those of the adjacent toggle arm the toggle mechanism of both cutter levers are in operation and both sets of cutters on these levers are moved into and out of their operative position upon rocking the operating shaft. When, however, the clutch sleeve 132 is withdrawn axially so that its teeth are disengaged from those of the adjacent toggle arm the rocking movement of the operating shaft does not shift the left main cutter lever into its operative position but only moves the right cutter lever into its operative position for cutting the corresponding ends of the barrel staves. The clutch sleeve 132 may be moved into and out of its operative position by any suitable means, for instance, by a hand lever 135 mounted on the outer side of the left head stock and engaging with the clutch sleeve 132, as shown in Figs. 2 and 3. In order to prevent the left toggle arm from dropping out of place when the same is disconnected from the companion bearing sleeve a stop device is provided which preferably comprises a stop screw 136 arranged in a lug 137 projecting inwardly from the left toggle arm and bearing against an adjacent relatively stationary part of the machine, for instance, the cap of the bearing in which the hub of the left hand driving gear pinion is journaled. Upon sliding the head stocks lengthwise of the machine the bearing sleeves 114, 115 of the toggle mechanism slide upon the operating shaft without disturbing the operative connection between the operating lever and the cutter levers.

At the same time that the main cutter levers are moved into and out of their operative positions two end trimming cutters 138 are moved into and out of their operative position for trimming off the ends of the staves during the rotation of the barrel shell. These end trimming cutters are arranged along the outer sides of the right and left head stocks, respectively, and are adapted to move inwardly across the end portions of the staves for trimming the ends thereof. Each of these end trimming cutters is mounted on the upper arm of an auxiliary rock lever 139 which is pivoted to turn in a vertical position adjacent to the respective head stock. The auxiliary cutter lever is normally held by gravity in a position in which its cutter is out of the path of the barrel staves, by reason of the overhang of the upper arm of this cutter and the parts mounted thereon. The forward or operative movement of this cutter lever is produced by means of a tappet 140 arranged on the lower part of the main cutter lever and engaging with a roller 141 mounted in an opening in the lower arm of the auxiliary cutter lever. This tappet is preferably curved concentrically with the axis of the respective main cutter lever and is adjustable in a circumferential direction relatively thereto by means of a clamping screw 142 mounted on the respective main cutter lever and engaging with the side of the tappet, thereby enabling the parts to be timed relatively to each other so that the end trimming cutter performs its function properly. In order to enable each auxiliary cutter lever to be adjusted bodily transversely of the respective head stock to suit the barrel shell which is being cut this lever is pivotally mounted on a slide 143 which is guided in a radial way 144 formed on the respective head stock and held adjustably in place thereon by means of a clamping screw 145 passing through a longitudinal slot 146 formed in the slide, as shown in Figs. 3 and 4.

The timing of the means for turning the chuck rings and the means for moving the cutters into their operative position is so determined that upon turning the operating lever into its operative position the first part of this movement causes the driving pulley to be connected with the driving shaft so that the barrel shell is rotated and during the next part of this movement of the operating lever the cutters are moved into their operative position, thereby starting the rotation of the barrel shell before the same is engaged by the cutters.

In order to still further hold the two head stocks firmly against displacement relatively to each other during the cutting operation means are provided whereby one of the head stocks is firmly clamped to the supporting bar upon which the same slides into and out of its operative position. As shown in Figs. 1, 2, 4 and 7, this clamping mechanism is arranged to connect the front sleeve of the right head stock with the front supporting bar during the operation of moving the cutters into their operative position. This auxiliary clamping mechanism comprises a clamping block 147 adapted to engage with the underside of the front supporting bar and movable vertically in a guide opening 148 in the underside of the front supporting sleeve of the right head stock, an inner clamping lever 149 pivoted on the lower part of the right front supporting sleeve and provided with a screw 150 which bears against the underside of the clamping block, an intermediate clamping lever 151 pivoted on the lower part of the right front supporting sleeve and engaging its inner arm with the underside of the inner clamping lever, a shifting rod 153 pivoted on the right toggle arm and passing loosely through an opening 154 in the upper arm of the intermediate clamping lever 151, and a spring 155 surrounding the shifting rod 153 and bearing at one end against a collar 156 on this rod and at its other end against the inner side of the upper arm of the intermediate clamping lever, as best shown in Fig. 7. Upon turning the operating shaft in the direction for moving the cutters into their operative position the adjacent toggle at the same time moves upwardly and outwardly so as to press the spring 155 against the intermediate clamping lever from which latter the motion is in turn transmitted to the inner clamping lever, whereby the clamping block is pressed against the underside of the front supporting bar and the left head stock is firmly locked on this bar, thereby aiding in holding the two head stocks against displacement relatively to each other and securely gripping the barrel shell between the two chuck rings so as to insure proper cutting of the same. Upon turning the operating shaft in the opposite direction for disengaging the cutters from the barrel staves the respective toggle arm swings inwardly and downwardly so as to release the pressure on the spring 155 and thereby relieve the grip of the clamping block 147 against the front supporting bar.

When adjusting the cutters for cutting a particular barrel shell it is desirable to move the cutters toward and from the barrel shell without turning the latter. In order to permit of this, means are provided whereby the shifting block 82 and shifting rod 83 are held in their inoperative position while the operating lever is turned in a direction for moving the main and auxiliary cutter levers into their operative position relatively to the barrel staves. The preferred means for this purpose which are shown in the drawings comprise a tappet 157 secured to the shifting rod 83 adjacent to its right hand end, and a vertically swinging cam lever 158 mounted on the right end of the main frame and provided on its rear arm with a cam 159 adapted to engage with the tappet 157. Upon turning this cam lever so that its cam engages with the tappet of the shifting rod the latter will be shifted into its retracted position and held there, together with the shifting block, thereby preventing the spring 84 from moving the shifting rod and block in a direction which would cause the driving pulley to be connected with the driving shaft, notwithstanding that the operating lever 89 is turned in a direction for moving the cutters into the path of the barrel staves at which time the cam 90 on the operating lever presents its low face to the roller on the front arm of the intermediate rock lever 86 which ordinarily would permit the spring 84 to couple the driving clutch and cause the barrel rotating mechanism to operate.

This machine is very durable in construction, the same is easily adjusted and controlled, and it permits of cutting barrels expeditiously, reliably and economically.

I claim as my invention:

1. In a machine of the character described, the combination of a main frame, head stocks slidable on said frame toward and from each other, a chucking device mounted on each of said stocks and adapted to engage one end of a barrel shell, and means for shifting said head stocks comprising shifting members each of which is connected with one of said head stocks on substantially diametrically opposite sides thereof and pressure means connected with said shifting members axially in line with said head stocks and chucking devices.

2. In a machine of the character described, the combination of a main frame, head stocks slidable on said frame toward and from each other, chucking devices mounted on said head stocks and adapted to engage opposite ends of a barrel shell, and means for shifting said head stocks comprising a yoke connected with each of said head stocks at substantially opposite sides thereof, a horizontal shifting rod connected with said yoke and arranged axially in line with the respective chucking device, and rock levers pivoted on said frame and each connected with one of said shifting rods.

3. In a machine of the character described, the combination of a head stock, a main cutter lever pivoted on the head stock and provided with a cutter adapted to approach the barrel shell from the inner side of the latter, an auxiliary cutter lever independent of said main lever pivoted on the head stock and provided with a cutter adapted to approach the barrel shell from the outer side thereof, and means for transmitting motion from said main cutter lever to said auxiliary cutter lever comprising an adjustable tappet which is curved concentrically with the main cutter lever and engages said auxiliary cutter lever, and a clamping screw for adjustably securing said tappet in an opening in said main cutter lever, said main and auxiliary cutter levers having their axes arranged out of line with each other, the bearing face of said tappet which engages said auxiliary cutter lever being arranged radially with reference to the axis of the main cutter lever on which it is mounted.

4. In a machine of the character described, the combination of a main frame, a head stock movable lengthwise of said frame, a cutter lever mounted on said stock, a bearing sleeve journaled on said head stock, a toggle arm mounted on said sleeve, a toggle link connecting said arm and lever, an operating shaft journaled in said frame and extending through said sleeve, said shaft and sleeve being constructed to compel the same to turn together but permit the sleeve to move lengthwise on the shaft independently of the latter, and means for connecting and disconnecting said bearing sleeve and toggle arm comprising a clutch sleeve splined on the bearing sleeve and provided with clutch teeth adapted to be engaged with and disengaged from the clutch teeth on the bearing sleeve.

5. In a machine of the character described, the combination of a main frame, a head stock movable lengthwise of said frame, a cutter lever mounted on said stock, a bearing sleeve journaled on said head stock, a toggle arm mounted on said sleeve, a toggle link connecting said arm and lever, an operating shaft journaled in said frame and extending through said sleeve, said shaft and sleeve being constructed to compel the same to turn together but permit the sleeve to move lengthwise on the shaft independently of the latter, and means for connecting and disconnecting said bearing sleeve and toggle arm comprising a clutch sleeve splined on the bearing sleeve and provided with clutch teeth adapted to be engaged with and disengaged from the clutch teeth on the bearing sleeve, and a stop arranged on said toggle arm and adapted to engage with an adjacent part of said head stock.

6. In a machine of the character described, the combination of a main frame, two head stocks mounted on said frame and movable toward and from each other, cutter levers mounted respectively on said head stocks, an operating shaft journaled on said frame, permanent means for operatively connecting one of said cutter levers with said shaft, and detachable means for operatively connecting the other lever with said shaft.

7. In a machine of the character described, the combination of a main frame, two head-stocks mounted on said frame and movable toward and from each other, cutter levers mounted respectively on said head stocks, an operating shaft journaled on said frame, bearing sleeves journaled respectively on said head stocks, a relatively fixed toggle arm secured to one of said bearing sleeves and connected by a link with one of said cutter levers, a relatively loose toggle arm mounted loosely on the other bearing sleeve and connected by a link with the other cutter lever, and means for connecting and disconnecting said loose toggle arm and its companion bearing sleeve.

8. In a machine of the character described, the combination of a main frame, head stocks mounted on said frame, chuck rings rotatable in said stocks, a driving shaft journaled on the main frame and operatively connected with said chuck rings, a driving pulley, a clutch for connecting and disconnecting said driving pulley and driving shaft, cutter levers mounted on said head stocks, an operating shaft operatively connected with said cutter levers, and a single means for shifting said operating shaft and clutch in unison.

9. In a machine of the character described, the combination of a main frame, head stocks mounted on said frame, chuck rings rotatable in said stocks, a driving shaft journaled on the main frame and operatively connected with said chuck rings, a clutch disk secured to said driving shaft, a driving pulley mounted loosely on said driving shaft, a shifting block mounted on said driving shaft and engaging said pulley, a spring for moving said shifting block and engaging said pulley with said clutch disk, cutter levers mounted on said head stocks, an operating shaft journaled on the main frame and operatively connected with said cutter levers, an intermediate lever connected with said shifting block, and a cam mounted on said operating shaft and engaging said intermediate lever.

10. In a machine of the character described, the combination of a main frame, head stocks mounted on said frame, chuck rings rotatable in said stocks, a driving shaft journaled on the main frame and operatively connected with said chuck rings, a clutch disk secured to said driving shaft, a driving pulley mounted loosely on said driving shaft, a shifting block mounted on said driving shaft and engaging said pulley, a spring for moving said shifting block and engaging said pulley with said clutch disk, cutter levers mounted on said head stock, an operating shaft journaled on the main frame and operatively connected with said cutter levers, an intermediate lever connected with said shifting block, a cam mounted on said operating shaft and engaging said intermediate lever, and an operating lever connected with said operating shaft.

11. In a machine of the character described, the combination of a main frame, head stocks mounted on said frame, chuck rings rotatable in said stocks, a driving shaft journaled on the main frame and operatively connected with said chuck rings, a clutch disk secured to said driving shaft, a driving pulley mounted loosely on said driving shaft, a shifting block mounted on said driving shaft and engaging said pulley, a spring for moving said shifting block and engaging said pulley with said clutch disk, cutter levers mounted on said head stocks, an operating shaft journaled on the main frame and operatively connected with said cutter levers, an intermediate lever connected with said shifting block, a cam mounted on said operating shaft and engaging said intermediate lever, and means for holding said shifting block in an inoperative position independently of said operating shaft.

12. In a machine of the character described, the combination of a main frame, head stocks mounted on said frame, chuck rings rotatable in said stocks, a driving shaft journaled on the main frame and operatively connected with said chuck rings, a clutch disk secured to said driving shaft, a driving pulley mounted loosely on said driving shaft, a shifting block mounted on said driving shaft and engaging said pulley, a spring for moving said shifting block and engaging said pulley with said clutch disk, cutter levers mounted on said head stocks, an operating shaft journaled on the main frame and operatively connected with said cutter levers, an intermediate lever connected with said shifting block, a cam mounted on said operating shaft and engaging said intermediate lever, and means for holding said shifting block in an inoperative position independently of said operating shaft comprising a tappet connected with said shifting block and a cam lever pivoted on the main frame and having a cam engaging with said tappet.

13. In a machine of the character described, the combination of a main frame, a supporting bar mounted on the frame, a head stock slidable on said bar, and means for clamping said head stock on said bar comprising a clamping block guided on the head stock and bearing against the bar, an inner clamping lever pivoted on the head stock and engaging the clamping block, and an outer clamping lever having one of its arms engaging said inner clamping lever.

14. In a machine of the character described, the combination of a main frame, a supporting bar mounted on the frame, a head stock slidable on said bar, and means for clamping said head stock on said bar comprising a clamping block guided on the head stock and bearing against the bar, an inner clamping lever pivoted on the head stock and engaging the clamping block, an outer clamping lever having one of its arms engaging said inner clamping lever, a rock arm, and a spring interposed between said rock arm and outer clamping arm.

15. In a machine of the character described, the combination of a main frame, a supporting bar mounted on the frame, a head stock slidable on said bar, and means for clamping said head stock on said bar comprising a clamping block guided on the head stock and bearing against the bar, an inner clamping lever pivoted on the head stock and engaging the clamping block, an outer clamping lever having one of its arms engaging said inner clamping lever and provided in its other arm with an opening, a rock arm, a shifting rod connected with said rock arm and passing through the opening of said outer clamping arm, and a spring interposed between said outer clamping arm and a collar on said shifting rod.

16. In a machine of the character described, the combination of a main frame, a supporting bar mounted on said frame, a head stock slidable on said bar, a cutter lever pivotally mounted on said head stock, a device for clamping said head stock on said bar, a chuck ring rotatably mounted on said head stock, a driving shaft, a clutch device for connecting and disconnecting said chuck ring and driving shaft, and means for simultaneously operating said clutch device, clamping device and cutter lever.

Witness my hand this 15th day of July, 1914.

EDWIN F. BEUGLER.

Witnesses:
 THEO. L. POPP,
 ANNA HEIGIS.

Copies of this patent may be obtained for five cents each, by addressing the "Commissioner of Patents, Washington, D. C."